J. A. REEVES.
PANORAMIC CAMERA.
APPLICATION FILED FEB. 8, 1906.
1,071,346.
Patented Aug. 26, 1913.
6 SHEETS—SHEET 1.
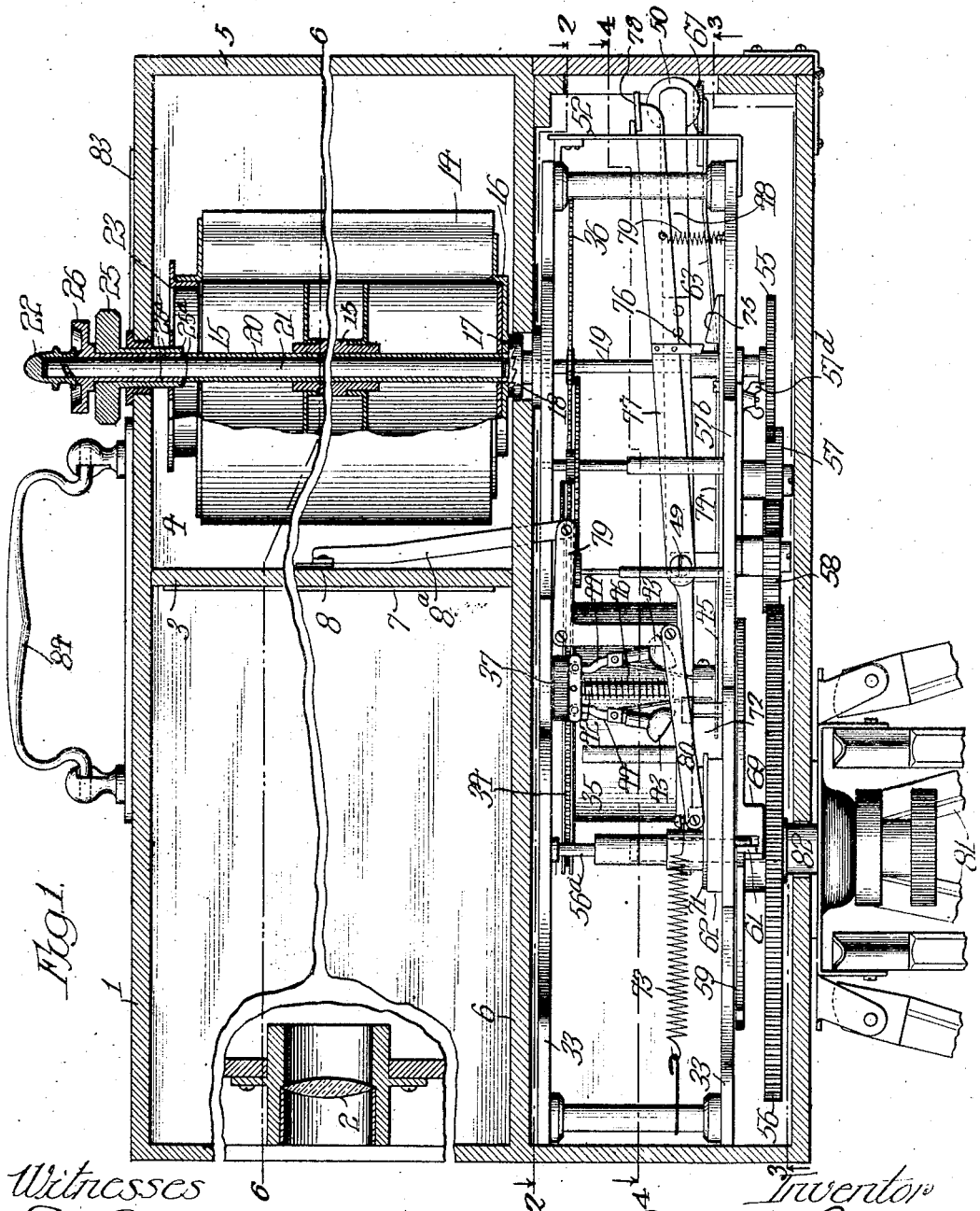

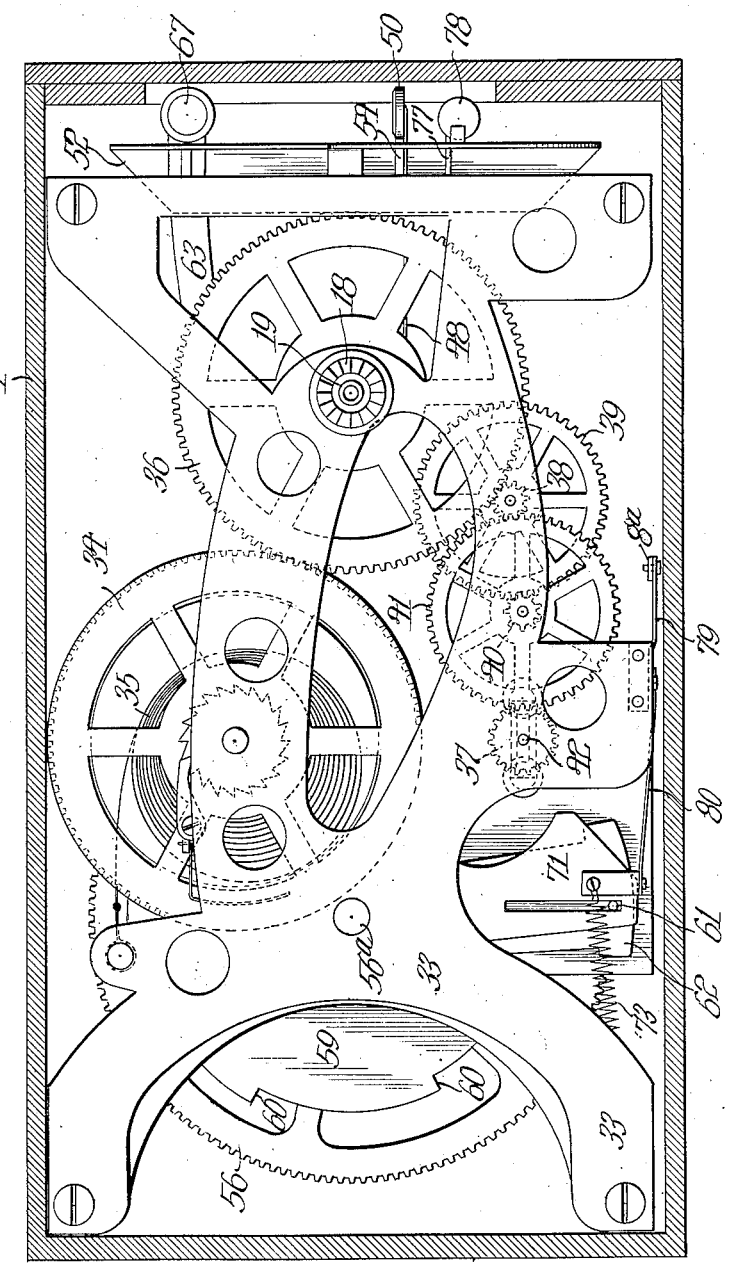

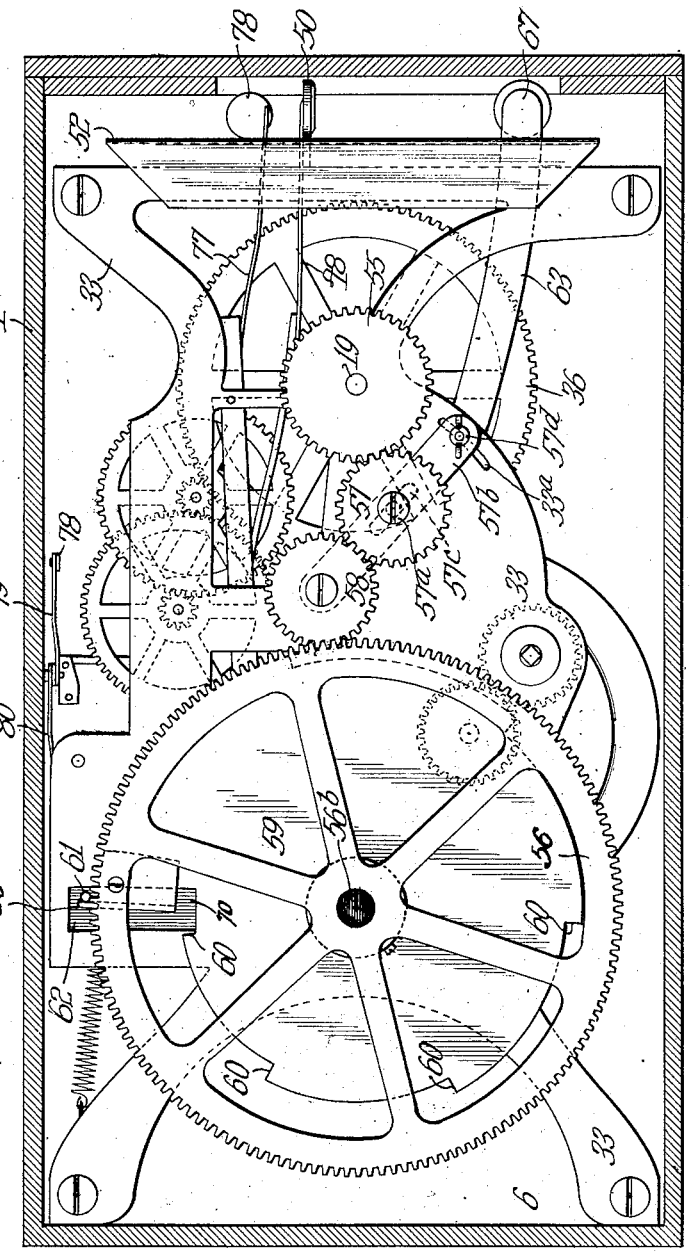

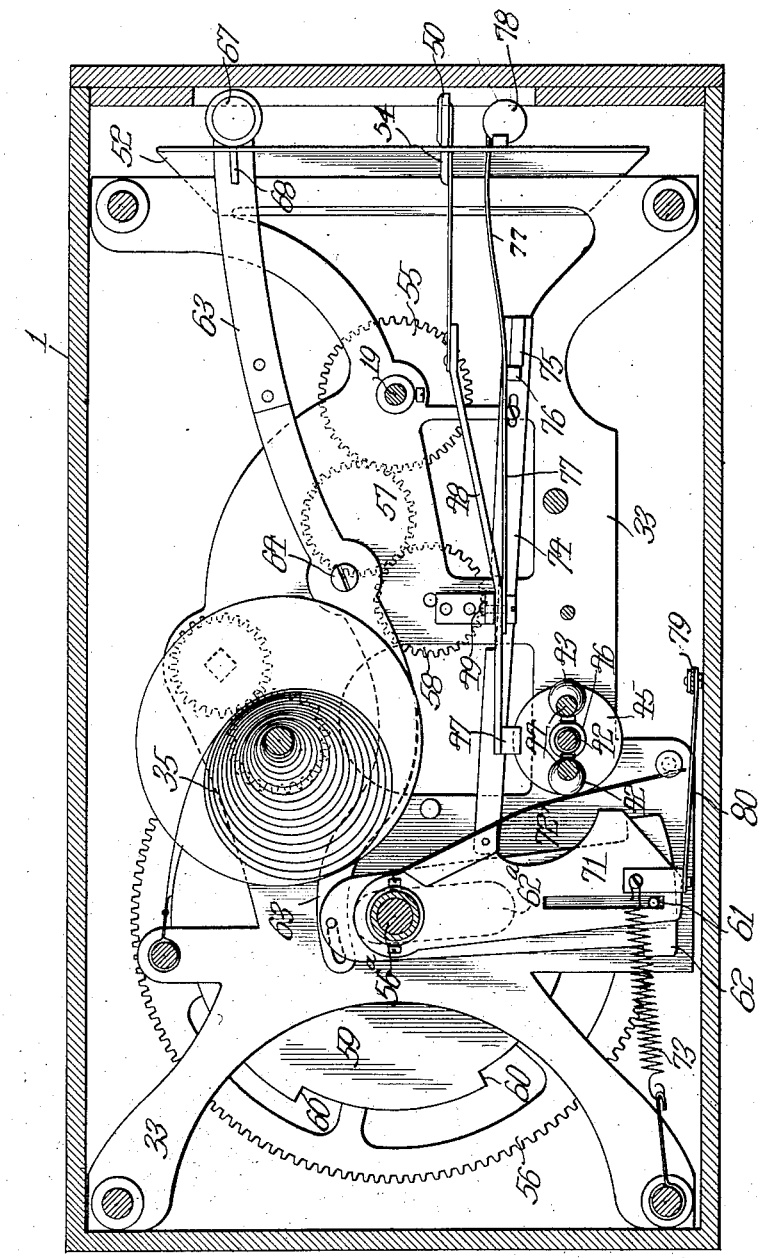

J. A. REEVES.
PANORAMIC CAMERA.
APPLICATION FILED FEB. 8, 1906.
1,071,346.
Patented Aug. 26, 1913.
6 SHEETS—SHEET 5.
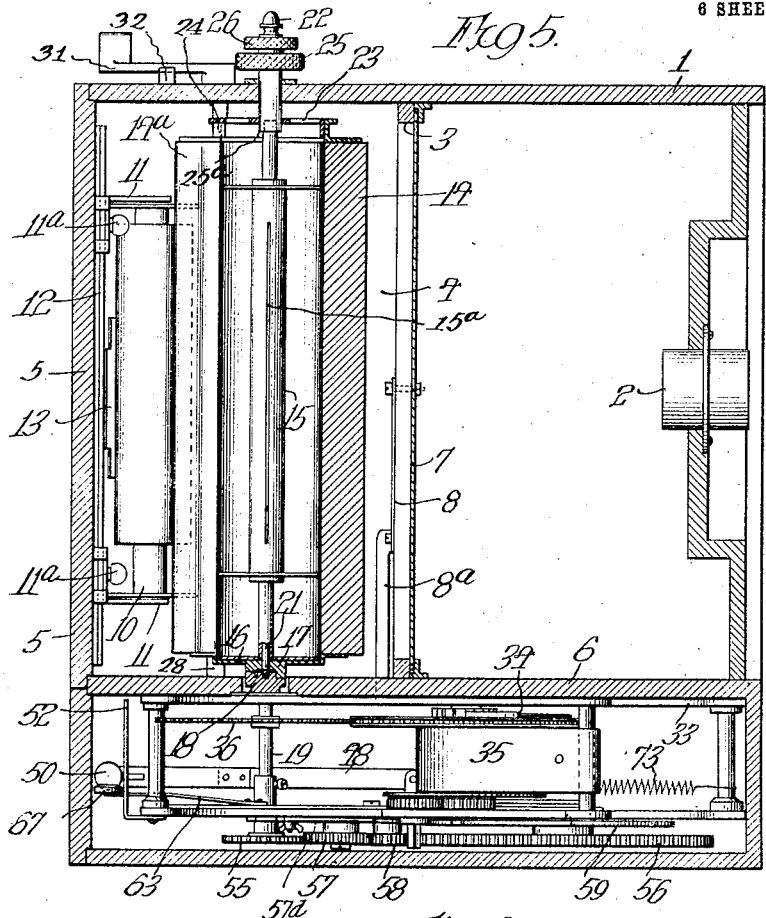
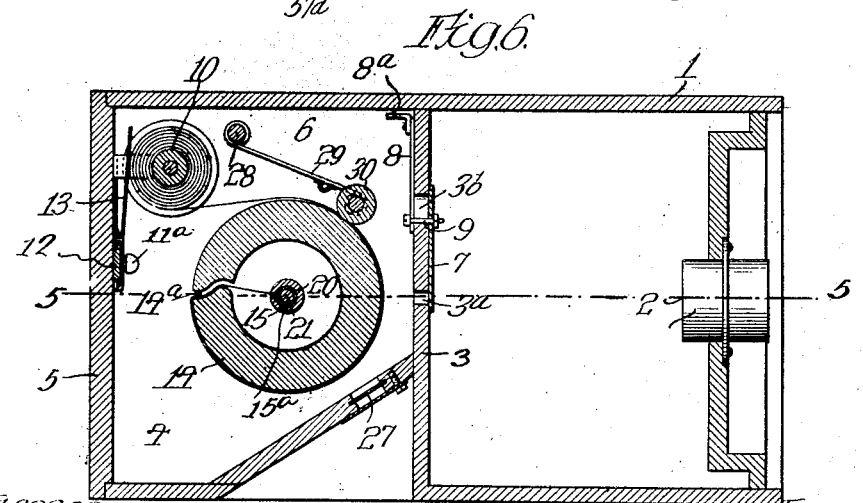

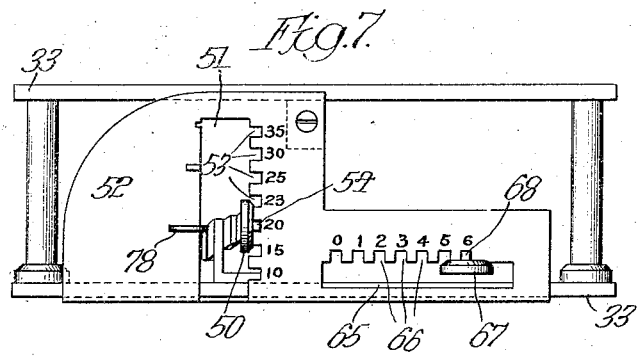
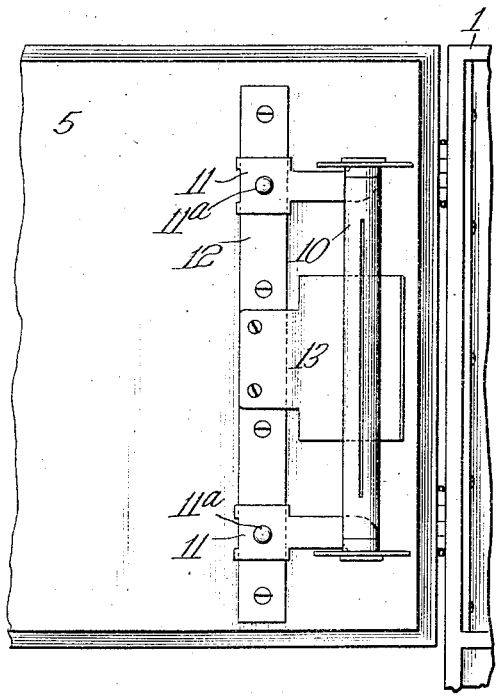
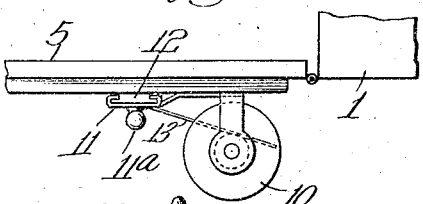
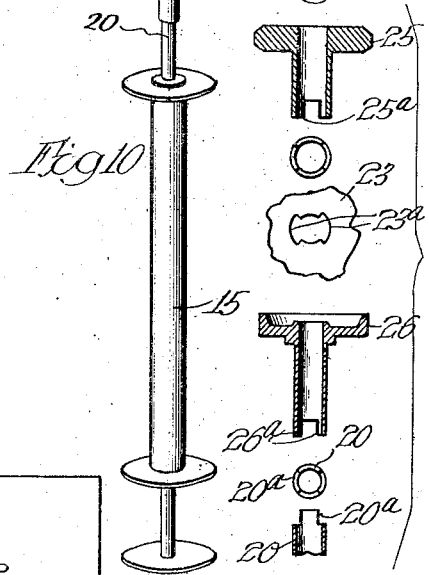
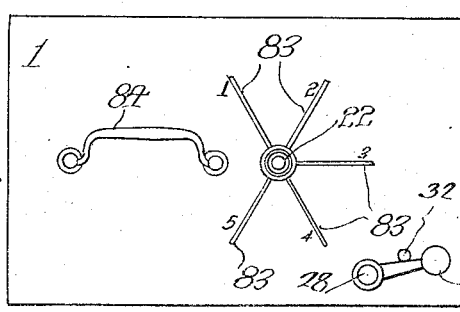

UNITED STATES PATENT OFFICE.

JOHN A. REEVES, OF CHICAGO, ILLINOIS, ASSIGNOR TO EASTMAN KODAK CO., OF ROCHESTER, NEW YORK, A CORPORATION OF NEW YORK.

PANORAMIC CAMERA.

1,071,346. Specification of Letters Patent. Patented Aug. 26, 1913.

Application filed February 8, 1906. Serial No. 300,123.

*To all whom it may concern:*

Be it known that I, JOHN A. REEVES, a citizen of the United States, residing at Chicago, Cook county, Illinois, have invented certain new and useful Improvements in Panoramic Cameras, of which the following is a specification.

My invention relates to what are known as panoramic cameras and the object thereof is to produce a simple and efficient camera of this character having many novel and advantageous features of construction, as will be hereinafter made apparent.

In the drawings, Figure 1 is an enlarged central longitudinal section of my panoramic camera; Figs. 2, 3 and 4 sectional plans on the lines 2, 3, and 4, respectively, of Fig. 1 but on a reduced scale; Fig. 5 a cross section on the line 5—5 of Fig. 6; Fig. 6 a cross section on the line 6 of Fig. 1 but on a reduced scale; Fig. 7 a rear elevation of a portion of my camera illustrating certain of the adjustments; Fig. 8 an elevation of a portion of the rear door of the camera illustrating the film spool; Fig. 9 a plan view of the parts illustrated in Fig. 8; and Fig. 10 a perspective view of the film receiving spool; Fig. 11 detail views of the adjusting nuts and associated parts; and Fig. 12 a plan view, on a reduced scale, of the top of the camera box.

Referring to the present embodiment of my invention as herein illustrated, the camera box or case 1 is provided as usual at its front end with a lens 2 and such box is provided with a vertical partition 3 toward the middle portion thereof, so as to provide a compartment 4, in which the film is arranged, this compartment being openable at the back by the provision of a door or closure 5, as illustrated in Figs. 1, 6, 8 and 9. The mechanism hereinafter described, which swings or revolves the entire camera is arranged in the lower portion of the camera box and below a false bottom or partition 6 therein, as clearly indicated in Fig. 1.

According to my construction, the lens is always open and is neither provided with the usual lens shutter nor with a cap to be removed and replaced in the operation of the camera, but for governing the exposure I provide a shutter which controls the vertical opening or slot 3ª in the partition 3, Fig. 6, and in the present instance I cause this shutter to be automatically operated, with the result that the operator is entirely relieved of the duty of working the shutter. This shutter 7 consists of a thin strip of suitable material, such as thin sheet metal, which is arranged to slide upon one side of the partition 3 and across the slot thereof so as to open or close the same, as the case may be, according to the particular position of the shutter. This shutter is provided with a suitable operating connection controlled by the power mechanism in the lower part of the camera, but in the present instance the shutter is operatively connected with a bell crank 8 pivoted to the rear side of the partition 3 and having a pin 9 extending through a slot 3ᵇ in the partition 3 and engaging the shutter, as indicated in Fig. 6. When the bell crank is rocked in the manner hereinafter described the shutter is opened and closed. My shutter is such as to obtain all the advantages of the well known focal plane type of shutter.

The film is arranged in the compartment 4 and is adapted to be passed by the exposing slot in automatic manner and to be wound upon a receiving spool. According to the present construction, the unexposed film is mounted upon a spool 10, Fig. 8, which is secured in suitable manner to the inside of the door 5 of the camera. In order that the camera may be enabled to receive different widths of film, whereby the range of usefulness of the camera may be considerably increased, the spool is mounted at its ends to rotate in a pair of brackets 11, whose free ends are formed as slides adjustable vertically in one direction or the other upon a vertical slide plate 12, which is secured to the inner side of the door 5. For the purpose of applying tension to the film, I provide a spring plate 13 secured at one end to the slide plate 12 with its free end in position to press with a yielding pressure upon the outer surface of the film as it is being paid out. These slides 11 are held in their adjusted position in any suitable manner, as by means of set screws 11ª. It will be understood that any size of film within the limits of the slide plate 12 may be employed in my camera, with the result that a single camera is adapted for use in connection with a considerable range of width of films.

The film winding spool is arranged within the compartment 4 and is adapted to be automatically rotated at the proper rate by the power mechanism in a manner hereinafter described. In the present instance and by preference, I provide in connection with this winding spool a receiving spool arranged within the winding spool and to which the exposed film may be received from the winding spool by certain manipulations of the operator, as hereinafter described.

The winding spool is in the form of a drum or cylinder 14 and the same will be hereinafter referred to as the winding drum or cylinder, in order to distinguish it from the receiving spool 15 arranged within the cylinder or drum and formed somewhat similar to the film spool 10. The winding drum or cylinder may be made of any suitable material and is provided with a cylindrical bore open at top and bottom and with a longitudinal side slot 14ª, as seen in Fig. 6. As shown in Figs. 1 and 5, the winding drum is provided at its lower end with a bearing member or spider 16 having an end ratchet 17 in order that the same may be driven by a corresponding end ratchet 18 secured to a vertical shaft or arbor 19 which is driven by the power mechanism in the manner hereinafter explained. It will be evident that when the free end of the film is secured to the winding drum, or rather to the receiving spool therein, the film as exposed will be automatically wound upon the outside of the winding drum or cylinder.

The receiving spool which is arranged within the winding drum, comprises a spool proper marked 15, on which the film is arranged to be wound and having the usual longitudinal slot 15ª into which the free end of the film is inserted for engagement therewith. A sleeve 20 is passed through and secured to the receiving spool and is of such length as to extend beyond both ends of such spool. Within the sleeve extends a rod 21, whose lower end is screw-threaded so as to screw into the upper end of the driving shaft 19 and which is provided at its upper end with a small knob 22 connected with the rod in such manner as to be capable of rotating the rod and also of partially rotating independently of the rod and at the same time capable of moving slightly longitudinally thereof. To this end, the knob has a pin and slot connection with the rod, the slot being inclined, all as clearly illustrated in detail in Fig. 1. The purpose of this independent longitudinal movement of the knob will be hereinafter made apparent.

The winding drum at its upper end is provided with a head 23 which is in the form of a spider and arranged to be removed from the drum or cylinder, but adapted to be secured thereto to rotate in unison therewith when in its proper position. In the present instance, this spider 23 is inwardly flanged so as to fit within the bore of the drum, such flange being slotted at one point and thereat provided with a lug 24 which fits within the inner side of the slot 14ª of the drum. This head or spider is adapted to be operatively connected with some hand-operating means extending outside of the camera box. A suitable operating connection for this purpose is illustrated in the drawings, Figs. 1, 5 and 11, wherein is shown a rotatable hand wheel or nut 25 having a downwardly extending sleeve, which sleeve terminates in two opposite engaging teeth or projections 25ª. These teeth engage the hub of the spider 23 and to this end the same pass through opposite slots 23ª therein. It results from this construction and arrangement that by rotating the nut or wheel 25 the operator is enabled to rotate the winding drum or cylinder independently of its driving mechanism, which independent rotation accomplishes a purpose hereinafter described. In similar manner provision is made for rotating the receiving spool by operating means extending outside of the camera box and according to the present illustrated construction this result is accomplished by the employment of a second hand wheel or nut 26 which is arranged above the nut 25 and is similarly provided with a sleeve terminating in projections or engaging teeth 26ª. The sleeve of the nut 26 immediately surrounds the rod 21 and is concentric with the sleeve of the nut 25, inasmuch as it extends within the latter. The teeth 26ª are arranged to engage corresponding notches or slots 20ª in the sleeve 20, with the result that when the nut 26 is rotated the receiving spool is rotated in the same direction by reason of the engagement of the teeth 26ª in said slots 20ª.

By the provision of the winding drum or cylinder and the receiving spool contained therewithin, and also the provision of the operating parts associated therewith, I am enabled to transfer the exposed film from the exterior surface of the winding drum or cylinder to the receiving spool, such transfer being accomplished within the camera box itself by simply manipulating the operating connections on the exterior of the box and without removing the parts from the camera. The result of this construction and arrangement is that the exposed film may be transferred to the receiving spool, which may thereupon be removed by the operator from the camera in daylight when the door 5 is opened, after which a new film may be inserted upon the film spool 10 and threaded through the compartment 4 and past the exposing slot in the manner hereinafter explained. Assuming that an entire film has been exposed and wound around the drum or cylinder and it is now desired to re-load the camera, the operator rotates the nut 26 in an anti-clockwise direction, Fig. 6, it being understood that the forward end of the film has been threaded through the slot 14$^a$ and secured to the receiving spool in the usual manner. This rotating of the receiving spool will cause the unwinding of the film from the drum and the winding thereof upon the receiving spool. When the entire film has been wound upon such spool the entire drum and its containing spool are withdrawn from the camera after the door 5 is opened, it being understood that in this operation the rod 21 is unscrewed and removed, together with the operating nuts 25 and 26. It will be observed that this operation of transferring and winding the exposed film from the drum to the receiving spool is accomplished entirely within the camera box by the manipulation by the operator of the nut 26 which is arranged outside of the box. The receiving spool may now be removed and the new one inserted. In loading the camera with another film, the film is mounted on the spool 10 and the free end thereof is secured to the empty receiving spool just before the insertion of the latter into the upper end of the winding drum or cylinder. The receiving spool is now inserted in place within the drum and in this operation the forward portion of the film passes downwardly in the slot 14$^a$. The drum is now inserted in place and the rod 21 is also inserted and screwed into the shaft 19. The door 5 is now closed and the film is advanced to the proper point to receive the first exposure, such advance or movement of the film being controlled by the operator in the following manner: The nut 22 is partially turned by the operator, with the result that the winding drum now has a slight longitudinal movement independently of the rod 21, which movement is sufficient to permit the ratchets on the lower end of the drum to ride over their corresponding ratchets, with the result that the drum may be moved in a clockwise direction, Fig. 6, independently of its driving mechanism in the lower compartment of the camera box. The operator, by rotating the lower nut 25 inward turns the drum in a clockwise direction to unwind the film from the film spool and to advance it to a position proper for the first exposure. The extent of this advancement or adjustment of the film is determined by the operator by observing the film through a small side opening or window 27 preferably formed of red glass, Fig. 6. The camera is now not only loaded, but ready for immediate use.

My camera is enabled to employ films of a considerable range as to width, by reason of the adjustable spool brackets supported on the door 5. To accommodate films of greater width than those capable of use in the present illustrated camera, the camera is simply made of large proportions without any change in the general construction or principle thereof.

By preference and as illustrated in Fig. 6, I employ a tension device for the purpose of pressing with a yielding pressure against the exposed film as it is being wound upon the exterior of the drum or cylinder. As herein shown, this tension device comprises a vertical rock shaft 28 having its bearings in the top of the box and also in the partition 6 thereof and provided near its opposite ends and within the compartment 4 with two parallel forwardly extending spring arms 29 carrying between them a roller or series of rollers 30, mounted to rotate in the outer ends of such spring arms. These rollers are arranged to press upon the exterior of the drum, as illustrated in Fig. 6 and also upon the film being wound thereupon. In order to permit of the swinging of this tension device to an inoperative position, I extend the rock shaft 28 upwardly through the top of the camera box and provide the same at its upper end with an arm or handle 31 which is normally pressed against a stop 32 formed on one of the indicating strips hereinafter referred to. This handle is made of resilient material, so that the same may be raised upwardly to clear the stop to thereby swing the roller 30 away from the drum and to one of the inner corners of the film compartments 4. The tension device is removed or swung to this inoperative position whenever the film is being wound upon the receiving spool in the manner hereinbefore explained.

Referring next to the driving mechanism for rotating or revolving the entire camera box and at the same time rotating the drum or cylinder, I arrange such mechanism in the bottom of the camera box and below the partition 6 thereof. This mechanism resembles in a general way a clock movement so far as the driving spring and train of gears and pinions are concerned and I provide the same with a centrifugal governor which is placed under the control of certain adjustable devices for the purpose of varying the speed of the mechanism. Referring to the present construction and particularly to Figs. 2, 3 and 4, I mount within a frame 33 a main driving wheel 34 operatively connected in obvious manner with the motor or spring 35. This main driving wheel 34 meshes with a second gear 36 which is secured to the shaft or arbor 19 hereinbefore referred to as carrying the lower end ratchet 18 for operating the winding drum or cylinder. This gear 36 is connected with the governor pinion 37 by a train of gears comprising the pinion 38, gear 39, pinion 40 and gear 41. As shown in Fig. 1, the governor pinion is secured at the upper end of a vertical arbor 42, on which is mounted in any suitable and well known manner a pair of centrifugal governor balls 43 connected with a pair of arms 44 connected at their lower ends with a friction disk 45. This disk is mounted to slide longitudinally of the arbor 42 and is held to its downward position with a yielding pressure by means of a spiral spring 46 surrounding such arbor. It will be evident that the greater the speed of rotation of the governor balls, the higher the disk 45 will be elevated.

For varying or controlling the time of exposure I provide suitable mechanism coöperating with this disk 45, in the present instance such mechanism consisting of a friction device or shoe arranged to be interposed in the upward path of movement of the disk 45, with the result that such upward movement is limited by such shoe. As shown more particularly in Figs. 1 and 4, this shoe marked 47 is mounted at the inner end of a lever 48 of the first class and fulcrumed at 49. This lever extends rearwardly and terminates preferably in a button 50 for convenient manipulation by the operator and extends through a vertical slot 51 formed in a plate 52 which is secured at the rearward end of the frame 33 of the operating mechanism. The lever 48 is made of resilient material or at least the rearward end thereof is so made, as shown in Fig. 4, that the same will be held with yielding pressure toward the right hand side of the slot 51, Fig. 7. This side of the slot is provided with a series of notches 53 which are suitably graduated and indicated with numbers beginning, in the present instance, with "10" at the lowermost notch and terminating with "35" at the uppermost notch, such numbers representing seconds in time of exposure. One side of the lever 48 is provided with a rib or flange 54, which is adapted to engage in and be retained by any one of the series of notches to which such lever may have been adjusted. When the lever is adjusted, for instance, in the lowermost notch representing ten seconds, the shoe 47 is elevated to its highest position, so that the driving mechanism will be free to operate at its fastest speed. When the lever is adjusted to the uppermost notch representing thirty-five seconds, the shoe is at its lowermost position and arranged quite close to the friction disk 45, with the result that the power mechanism will operate at its slowest speed, and consequently the camera and the winding drum will move at a slower rate of speed.

For determining and varying the number of exposure lengths of the film which are passed before the exposing slot, I provide the following controlling mechanism: Referring more particularly to Figs. 1 and 3, the arbor 19 is provided at its lower end with a pinion 55 which is operatively connected with a large gear or master wheel 56 through the medium of the two pinions 56 and 57. This master wheel is mounted upon an arbor 56ᵃ as an axis, being held rigidly with respect to the tripod-head, and carries a disk 59 which is provided with a series of notches 60 located at different radial distances from said axis for a purpose hereinafter explained. These notches are arranged to coöperate with a radially adjustable pin 61, Figs. 1 and 4, which is adapted to be adjusted to a position corresponding with the desired number of exposure lengths to be exposed. When this adjustable pin is at its outermost position relative to the axis 56ᵃ, its path of movement is obstructed by the first notch, that is the notch located at the greatest radial distance from such axis, with the result that the camera body, together with the entire power mechanism, will be stopped as soon as such notch is contacted by the pin. In this operation the camera and the winding drum have been rotated to an extent corresponding with the greatest number of exposure lengths permitted by the present construction of machine, which is six exposure lengths. When such pin is at its innermost position, its path of movement is obstructed by the notch, which is arranged at the shortest radial distance from the axis 58, so that the camera body and the driving mechanism generally will be stopped when the camera has made a partial rotation and the drum or cylinder has been rotated to the extent of a single exposure length.

For the purpose of adjusting the pin 61 to a predetermined distance from the axis 56ᵃ, I mount the same on a radially movable arm 62, Fig. 4, which has a longitudinal slot 62ᵃ to accommodate the axis or arbor 56ᵃ which serves as a guide in the movement of such arm. The inner end of this arm is operatively connected with an irregular-shaped lever 63 fulcrumed at 64 and extending rearwardly. This lever 63 extends through a horizontal slot 65 in plate 52, in which slot the rearward end of the lever is laterally adjustable. This lever 64 is made of resilient material in its entirety or as to its rearward end as shown in Fig. 4, so that it may be held with yielding pressure against the upper edge of the slot 65, which is provided with a series of notches 66 properly spaced or graduated and provided with indicating figures from zero to 6, corresponding with the number of exposure-lengths. The lever 63 terminates at its rearward end in a button or enlargement 67 for convenient manipulation by the operator and the same is provided near such end with a lug or rib 68 which is adapted to be received and retained by any one of the notches to which such lug 68 may have been adjusted. When this lever is in a position to indicate "6" as shown in Figs. 4 and 7, the arm 62, together with its pin 61, is at its extreme outward position so that the mechanism is adjusted for the greatest number of exposure-lengths, but obviously when the lever 63 is adjusted to the position indicating 0, said arm 62 will be adjusted to its innermost position.

The outmost contact portion of the disk 59 while in effect a notch is, in the present instance, in the form of a projecting lug 69 extending radially from such disk but extending inwardly only partially so as to permit the pin 61 to enter the notch 70 in the disk, Fig. 3, in position to be contacted by the first or innermost notch 60. The pin 61 is extended upwardly from the sliding arm 62 and extends through a superimposed oscillating plate 71, Fig. 4. This latter plate is longitudinally slotted so as to permit of the hereinbefore described radial adjustments of the pin 61 and is arranged to be moved or oscillated slightly rearwardly whenever one of said notches or said lugs 69 contacts the pin 61 and slightly rocks the latter in a rearward direction. This plate 71 constitutes the brake for the driving mechanism and to this end the same is provided with an arm 72 which is adapted to be projected against the edge of the disk 45. In order to stop the revolution of the camera body gradually so as not to jar the mechanism, this arm 72 is formed as a spring. The described movement of the arm or plate 71 is made against the tension of a spring 73 which normally tends to hold the brake away from the disk 45. The plate 71 is connected with an arm or strip 74, Fig. 4, arranged to slide upon the lower frame 33 and provided at its rearward end with a projection or stop 75 which is arranged in the path of movement of a stop arm 76 depending from the intermediate portion of a lever 77. This lever is fulcrumed at its forward end upon the same fulcrum as the lever 48 and is extended rearwardly through the vertical slot 51 of the plate 52 and provided at such rearward end with an operating button 78. By preference this lever is normally downwardly spring pressed by means of a spring 79 so that its stop arm will normally be in position to engage the stop 75 when the strip 74 is slid rearwardly at the conclusion of an operation of the driving mechanism. After the two adjusting levers 48 and 63 have been adjusted for the proper range or arc of movement of the camera and for the proper time-exposure, the lever 77, which is an operating lever, is swung upwardly and the strip 74 is thereby released, with the result that the spring 73 automatically withdraws the brake from the governor, whereupon the driving mechanism instantly starts to operate. The operation of this mechanism continues until one of the notches 60 contacts the pin 61. As a result of this contact, the plate 62, as well as the plate 71 are slightly oscillated and the brake thereby moved to operative position to stop the governor. At the same time the strip 74 is shifted or slid rearwardly and engaged and retained in such position by means of the stop arm 76, ready for the next operation. The operation may be repeated with the same adjustments, or said levers 48 and 63 may be adjusted to correspond with different conditions of use, as may be desired or required.

As hereinbefore stated, the operator is relieved of the necessity of operating the shutter as to either its opening or closing movements and to this end I leave the lens entirely open, that is unprovided either with a cap or with the usual lens shutter and make provision for automatic operation of such shutter by the power or driving mechanism. In the present instance and as shown more particularly in Figs. 1, 4 and 6, I connect the bell crank 8, hereinbefore referred to, with a vertical link 8ª pivotally connected at its lower end with a bell crank 79 whose depending arm or member is in turn connected by means of a link 80 with the oscillating plate or arm 71. As a result of this connection the shutter is automatically opened at the very instant that the governor brake is released and the shutter is closed at the very instant that such brake is put into action again to stop the governor.

As shown more particularly in Fig. 3 and by preference, I provide means for varying the relative speeds of the revolution of the camera box and the rotation of the film device and in the present instance I accomplish this result by making provision for the substitution of different sizes of pinions in place of pinion 57 forming a part of the train of gearing between the arbor or shaft 19 and the large gear wheel 56. To enable such different sizes or diameter of these substitute pinions to be properly brought into mesh with both the pinions 55 and 58, I mount the pinion 57 on a stud 57ª which is secured in an adjustable or swinging arm 57ᵇ. This arm swings on the axis of the pinion 58 as a center and carries the stud 57ª at a point intermediate its length and also provides for the adjustment of the stud 57ª longitudinally thereof so that the pinion 57 may be brought into mesh with the pinion 58 whatever the diameter of the former pinion may be. As shown in Fig. 3, the arm 57ᵇ is provided with a longitudinal slot 57ᶜ to different positions in which the stud may be adjustably held. For this purpose of holding the arm 57ᵇ to the proper adjusted position I provide the same with a thumb-screw 57ᵈ adapted to engage in the slot 33ᵃ in the frame or plate 33 of the power mechanism. In this manner and by these means pinions 57 of different diameter may be employed for increasing or decreasing the speed of the gear wheel 56 relative to the speed of the arbor 19 which drives the film device. I am thus enabled to employ my construction of camera with lenses of different lengths of focus which require, of course, the passing of more or less film according to the length of focus, it being understood that the longer the focus the more film is required to be passed and vice versa. As will be evident, the diameter of the substitute pinions 57 will bear a certain relationship to the length of focus of the lens, such relationship being readily determined by those skilled in the art.

It will be understood that the entire camera box is suitably supported when in action by means of a tripod 81, the upper portion of which is illustrated in Fig. 1. This tripod is provided with an upwardly projecting bearing pin 82 having a slight taper and entering a correspondingly tapered opening 56ᵇ in the hub of the gear wheel 56 as shown in Fig. 3.

By the proper setting of the adjustments, that is the buttons 50 and 67, the camera is caused to expose any predetermined number of exposure lengths of film; that is, to make an exposure of any range varying from an arc of a circle to a complete circle and moreover the length of the time of exposure in sections or fractions of a second is predetermined. In this connection it will be understood that while in the drawings, Fig. 7, I have illustrated the graduations for the time of exposure for seconds or rather for different seconds increasing as high as five for each notch, the scale may be so graduated as to indicate consecutive seconds or certain seconds and fractions thereof of any degree. Furthermore, for the purpose of readily indicating to the operator the arc or range of exposure of the camera at any particular adjustment, the top of the camera box may be provided with a series of range finders comprising radial lines formed there or in any suitable manner so as to contrast with the body of the box, Fig. 12. In the present instance these lines are formed by thin metallic bars 83 radiating from a common center and located sixty degrees apart, in the present instance, five of these bars being used while the line of the points of attachment of the handle 84 of the box may be employed in lieu of a bar, which would be the sixth bar. Moreover these bars are numbered from 1 to 5 so as to correspond with the numbers on plate 52 for indicating the range of exposure or number of exposure lengths as shown in Fig. 7. For instance, when the button 67 is in engagement with the No. 4 notch shown in Fig. 7, the operator by simply glancing at the top of the camera box and observing the relative positions of the handle and the particular bar having the No. 4 upon it or adjacent thereto can readily perceive the range, that is the arc of revolution to which the camera is set or adjusted. If, however, the button 67 is in the No. 6 notch, as illustrated in Fig. 7, the operator will of course know that the camera is set or adjusted for one complete revolution because, under the present illustrated construction, a complete revolution means the exposure of six exposure lengths of film. There is no No. 6 bar on the top of the camera box but the line of the handle 84 suffices for this purpose.

I claim:

1. In a panoramic camera, the combination of an always open lens, a film operating device, a shutter, a motor, and separate means actuated by the motor for operating the film device and also said shutter.

2. In a panoramic camera, the combination of an always open lens, a film operating device, a shutter arranged adjacent the film, a motor, and separate means actuated by the motor for operating the film device and also said shutter.

3. In a panoramic camera, the combination of an always open lens, a film operating device, a shutter of the focal plane type arranged adjacent the film, a motor, and separate means actuated by the motor for operating the film device and also said shutter.

4. In a panoramic camera, the combination of an always open lens, a film-operating device, a shutter, a motor, and separate means actuated by the motor for operating the shutter, film device and also the camera as a whole.

5. In a panoramic camera, the combination, with a revoluble box provided with an exposing slot or aperture, of a lens in the box, a shutter governing said slot, a spring motor, means actuated thereby for automatically opening and closing the shutter in the operation of the camera, a film device whose film is adapted to be drawn across the slot, and separate means for operating the film device.

6. In a panoramic camera, the combination, with the revoluble box or case having an interior partition with an exposing slot or aperture, of a lens in the box, a shutter governing said slot, a film operating device adjacent said slot, a spring motor and means actuated thereby for automatically opening and closing the shutter in the operation of the camera and separate means for operating the film device.

7. In a panoramic camera, the combination, with the camera box or body and the mechanism for revolving the same, of means for varying the range or angle of revolution or the number of exposure-lengths of film, said means comprising a stationary disk and a stop controlled by the operator and adjustable to different positions for contact with different portions of the disk to stop the latter at different predetermined times according to the desired range of revolution.

8. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, and a movable stop controlled by the operator and adjustable to different radial distances to engage a notch corresponding with the desired range of revolution.

9. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, and a lever controlled by the operator and determining the particular position of the stop.

10. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, an arm carrying said stop, and a lever for radially moving said arm to adjust the position of the stop.

11. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, an arm carrying said stop and having a longitudinal slot to receive the axis of the disk, and a lever for radially moving said arm to adjust the position of the stop.

12. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, a lever controlled by the operator and operatively connected with the stop, and a plate 52 having a slot 65 through which one end of the lever extends and one of whose sides is provided with a series of notches 66 arranged to engage the lever in different adjusted positions.

13. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, a lever controlled by the operator and operatively connected with the stop, and a plate 52 having a slot 65 through which one end of the lever extends and one of whose sides is provided with a series of notches 66 arranged to engage the lever in different adjusted positions, said lever being held against such notched side of the slot with a yielding pressure.

14. In a panoramic camera, the combination, with the camera box or body and the mechanism for revolving the same, of means for varying the range or angle of revolution or the number of exposure-lengths of film, said means comprising a disk having a series of notches at different radial distances from the axis of the disk, a movable stop adjustable to different radial distances to engage a notch corresponding with the desired range of revolution, a lever controlled by the operator and operatively connected with the stop, and a plate 52 having a slot 65 through which one end of the lever extends and one of whose sides is provided with a series of notches 66 arranged to engage the lever in different adjusted positions, said lever being formed of resilient material at its said end whereby the same is held against the notched side of the slot with a yielding pressure.

15. In a panoramic camera, the combination, with the revoluble camera box, of mechanism for operating the same comprising a motor and a train of gears including a centrifugal ball governor, and means coöperating with the governor for braking the mechanism, consisting of a spring arm arranged to be pressed against the governor at the conclusion of the revolution of the camera box and means for varying the range of revolution and controlling the operation of said spring arm.

16. In a panoramic camera, the combination, with the revoluble camera box, of mechanism for operating the same comprising a motor and a train of gears including a centrifugal ball governor, and means coöperating with the governor for braking the mechanism consisting of a spring arm arranged to be pressed against the governor at the conclusion of the revolution of the camera box, an oscillating arm on which the spring arm is mounted, and means for varying the range of revolution and for moving said oscillating arm to stop the governor.

17. In a panoramic camera, the combination, with the revoluble camera box, of means for operating the same comprising a motor and a train of gears and including a centrifugal ball governor, a friction disk rotatable with the governor and moved thereby longitudinally of the direction of its axis of rotation, a spring brake arm arranged to be pressed against the edge of the disk to stop the governor, a disk having a series of notches at different radial distances from the axis of the disk, a stop pin adjustable radially to positions to be engaged by different ones of the notches, and an arm carrying the brake arm and moved by the stop pin at the conclusion of the operation of the camera.

18. In a panoramic camera, the combination, with the revoluble camera box, of mechanism for operating the same comprising a motor and a train of gears including a centrifugal ball governor, an arm arranged to brake the governor, a shutter, and an operating connection between said shutter and the brake arm.

19. In a panoramic camera, the combination, with the revoluble camera box, of mechanism for operating the same comprising a motor and a train of gears including a centrifugal ball governor, means coöperating with the governor for braking the mechanism consisting of a spring arm arranged to be pressed against the governor at the conclusion of the revolution of the camera box and an oscillating arm which carries the spring arm, a shutter, and an operating connection between said shutter and the oscillating arm.

20. In a panoramic camera, the combination, with the revoluble camera box and its film operating device, of means for revolving the camera box and rotating the film device, and means for changing the relative speeds of the revolution of the camera box and rotation of the film device.

21. In a panoramic camera, the combination, with the revoluble camera box and its film operating device, of mechanism for revolving the camera box, a driving connection between said mechanism and the film device for rotating the latter and including a train of gears, one of which is adjustable with respect to two adjacent gears in the train, whereby the speed of rotation of the film device may be increased or decreased.

22. In a panoramic camera, a film drum or cylinder on whose exterior the film is wound in the operation of the camera, and a receiving film-spool located centrally within the drum or cylinder and arranged to receive the film from the drum.

23. In a panoramic camera, a film drum or cylinder on whose exterior the film is wound in the operation of the camera, a film-spool located centrally within the drum and rotatable independently of the latter whereby the film may be transferred from the drum to the spool.

24. In a panoramic camera, a film drum or cylinder on whose exterior the film is wound in the operation of the camera, a film-spool located centrally within the drum or cylinder and arranged to receive the film from the drum, and means extending extraneous of the camera for rotating the spool independently of the drum.

25. In a panoramic camera, a film drum or cylinder on whose exterior the film is wound in the operation of the camera, and which is provided with a longitudinal slot, and a spool mounted to rotate centrally within the drum and to unwind the film from the drum, through the slot and onto itself as a receiving spool.

26. In a panoramic camera, a film drum or cylinder on whose exterior the film is wound in the operation of the camera, a film spool located within the drum or cylinder and arranged to receive the film from the drum, means extending outside of the camera for manually rotating the drum, and separate means for rotating the spool independently of the drum.

27. In a panoramic camera, a film drum or cylinder on whose exterior the film is wound in the operation of the camera, and which is provided with a longitudinal slot, a rotatable spool located within the drum, a sleeve extending into the spool and secured thereto, and an operating device outside of the camera and provided with a portion extending therein to engage said sleeve to rotate the spool independently of the drum.

28. In a panoramic camera, a film drum or cylinder on whose exterior the film is wound in the operation of the camera, and which is provided with a longitudinal slot, end heads for such drum, one of which is removable, a rotatable spool located within the drum, and an operating device outside of the camera and provided with a portion extending therein to engage one of the heads to rotate the drum at the will of the operator.

29. In a panoramic camera, the combination, with a film-supply spool, of a rotatable drum for drawing the film from such spool and presenting the same for exposure, and a receiving spool located within the drum for receiving the exposed film therefrom said supply spool being arranged outside said drum.

30. In a panoramic camera, the combination, with a film-supply spool, of a rotatable drum for drawing the film from such spool and presenting the same for exposure, means for applying tension to the film as wound upon the drum, and a receiving spool located within the drum for receiving the exposed film therefrom said supply spool being arranged outside said drum.

31. In a panoramic camera, the combination, with a film-supply spool, of a rotatable drum for drawing the film from such spool and presenting the same for exposure, means for applying tension to the film as wound upon the drum, comprising a spring pressed roller, and a receiving spool located within the drum for receiving the exposed film therefrom said supply spool being arranged outside said drum.

32. In a panoramic camera, the combination, with a film-supply spool, of a rotatable drum for drawing the film from such spool and presenting the same for exposure, means for applying tension to the film as wound upon the drum, comprising a spring pressed roller, means whereby such roller may be moved to an inoperative position, and a receiving spool located within the drum for receiving the exposed film therefrom said supply spool being arranged outside said drum.

33. In a panoramic camera, the combination, with a drum for moving the film and presenting the same for exposure, of a supply spool, a supporting strip 12, brackets in which the spool is mounted, said brackets being adjustable on said strip and longitudinally of the spool whereby spools and films of different lengths may be used, and a pressure plate 13 which is mounted on said strip and adapted to press open the outside of the roll.

JOHN A. REEVES.

Witnesses:
S. E. HIBBEN,
LOUIS B. ERWIN.